United States Patent [19]

Lender

[11] 4,086,587
[45] Apr. 25, 1978

[54] APPARATUS AND METHOD FOR GENERATING A HIGH-ACCURACY 7-LEVEL CORRELATIVE SIGNAL

[75] Inventor: Adam Lender, Palo Alto, Calif.

[73] Assignee: GTE Automatic Electric Laboratories Incorporated, Northlake, Ill.

[21] Appl. No.: 772,797

[22] Filed: Feb. 28, 1977

[51] Int. Cl.² .............................................. H04L 3/00
[52] U.S. Cl. ............................ 340/347 DD; 325/38 A
[58] Field of Search .............. 325/38 A; 340/347 DD

[56] References Cited

U.S. PATENT DOCUMENTS

| | | | |
|---|---|---|---|
| 3,492,578 | 1/1970 | Gerrish | 325/38 A |
| 3,601,702 | 8/1971 | Lender | 325/38 A |
| 3,679,977 | 7/1972 | Howson | 325/38 A |

*Primary Examiner*—Charles D. Miller

*Attorney, Agent, or Firm*—Leonard R. Cool; Russell A. Cannon

[57] ABSTRACT

Apparatus and method for generating a multilevel correlative signal wherein the multiple levels are digitally generated. A serial binary bit stream is first converted into two parallel binary bit streams each at half the bit rate of the original serial binary bit stream. The parallel bit streams are encoded in accordance with the relation $B = C - \Delta^2 C \text{ MOD } 4$; where B is the original waveform, C is the resultant waveform, and $\Delta^2$ indicates two units delay or 2T seconds where 1/T is the parallel speed in digits per second. Next the binary encoded bit streams are digitally converted to a 7-level waveform; and, finally the 7-level waveform is transformed into an analog signal which retains the 7-levels and provides a band limited 7-level signal related on a one-to-one basis to the binary input signal.

10 Claims, 6 Drawing Figures

TABLE I

| Time Slot | 74 a | 74 ā | 76 a | 76 ā | 78 a | 78 ā | 80 a | 80 ā | 82 a | 82 ā | 84 a | 84 ā |
|---|---|---|---|---|---|---|---|---|---|---|---|---|
| 1 | O | — | O | — | O | — | O | — | O | — | O | — |
| 2 | O | — | — | O | O | — | — | O | O | — | O | — |
| 3 | O | — | O | — | O | — | — | O | O | — | O | — |
| 4 | — | O | — | O | O | — | O | — | O | — | — | O |
| 5 | — | O | — | O | O | — | — | O | — | O | O | — |
| 6 | O | — | — | O | O | — | — | O | — | O | O | — |
| 7 | O | — | O | — | O | — | O | — | — | O | O | — |
| 8 | O | — | O | — | O | — | O | — | O | — | O | — |
| 9 | O | — | — | O | O | — | O | — | O | — | O | — |
| 10 | O | — | O | — | O | — | O | — | — | O | O | — |
| 11 | — | O | — | O | — | O | O | — | — | O | O | — |
| 12 | — | O | — | O | O | — | — | O | — | O | — | O |
| 13 | O | — | O | — | O | — | — | O | — | O | O | — |
| 14 | — | O | — | O | — | O | O | — | O | — | O | — |
| 15 | O | — | — | O | O | O | — | O | — | O | — | O |
| 16 | — | O | — | O | — | O | O | — | — | O | O | — |
| 17 | — | O | — | O | — | O | — | O | — | O | — | O |
| 18 | O | — | O | — | O | — | — | O | — | O | — | O |
| 19 | O | — | — | O | O | — | O | — | — | O | O | — |

APPARATUS AND METHOD FOR GENERATING A HIGH-ACCURACY 7-LEVEL CORRELATIVE SIGNAL

BACKGROUND OF THE INVENTION

1. Field of the Invention

This invention relates to digital transmission systems, and more particularly to a correlative technique which permits transmission of digital information at speeds significantly above presently achievable rates in a band limited channel.

2. Description of the Prior Art

The continuing demand for the rapid transmission of data has created a requirement for new data transmission techniques. However, in systems of which applicant is aware, the increase in transmission rate is achieved only at the expense of unacceptable equipment complexity, and hence greater cost, or in poor performance, relative to a binary system. One example of known band width compression techniques which permits transmission of more than one bit of information in a Nyquist interval is the quaternary baseband system, which compresses the bandwidth by a factor of two relative to binary. Here, serial binary data, represented by 0 and 1, is converted at the transmitter into four levels, each of which represents two of the original binary digits. In Gray code, the successive levels would represent 00, 01, 11 and 10. For example, the use of codes where successive levels differ only by one bit, such as the Gray code, is preferred because the difference of interpretation between adjacent levels causes only one of the digits to be in error. For example, if the level is actually 1, in which the two digits of the quaternary system are 01, an interpretation of the level at the receiver as 0 due to distortion caused by transmission impairments would result in an output sequence of 00, thus causing only a single error.

Similar compression techniques may be used in carrier transmission using AM, FM, phase modulation, etc. Where carrier is used and compression is required, phase modulation can be used, for example, with $n$ phases. The number of phases could be 4, 8, 16 or 32 for a practical system in which the total number of phase positions is a power of two. 4-level or 4-phase systems, which permit the transmission of one bit of information per cycle of available bandwidth in double side band carrier transmission, have been used commercially. This system, then, has a data transmission rate twice that of a binary system transmitting over the same band-limited channel.

The old and well-known vestigial side-band transmission technique has gained popularity in recent years as a means of compressing the bandwidth for high-speed data transmission. However, the success of this system depends on synchronous detection which requires that the carrier be regenerated with the correct frequency and phase at the receiver. The frequency can be quite accurately regenerated by the use of pilots. However, the phase must be recovered from the modulated signal and the characteristics of the vestigial signal makes accurate recovery of signal phase quite difficult. The accuracy with which the carrier is regenerated directly affects the permissible rate of transmission and error rates.

In comparing bandwidth compression transmission techniques with a binary system, not only is the complexity, and hence cost, of the equipment considered but the error performance relative to that of the binary system must also be evaluated. Error performance is most often established in terms of the noise penalty suffered by the higher speed system. Many factors affect the noise penalty, but the approximate value is assumed to be dependent upon the ability of the system to interpret a particular amplitude level or its equivalent. As shown in applicant's article entitled, "Correlative Level Coding for Binary-Data Transmission", IEEE Spectrum, Feb. 1966, Page 107, the approximate noise penalty relative to a binary system in dB, is $20 \log_{10}(b - 1)$, where $b$ is the number of levels. For quaternary AM system, the noise penalty is approximately 9.5 dB, and while the noise penalty for a 4-phase system is somewhat less than that of the AM quaternary, it suffers from the cost and complexity of the equipment required for proper recovery of the transmitted information.

The foregoing brief review shows the desirability of increasing the transmission rate without squaring the number of levels or phases for each doubling of the bit rate, as in the case for the multilevel techniques discussed above. It is also desirable to have a technique whereby each level or phase separately identifies the original binary data bits without regard to the past history of the waveform. These desirable criteria are found in the correlative techniques described in the aforementioned IEEE Spectrum article, and the duobinary correlative technique mentioned therein are described in greater detail in applicant's U.S. Pat. Nos. 3,234,465 and 3,238,299. Another correlative technique, which is referred to as the "Orthogonal Correlative Technique" is disclosed in applicant's U.S. Pat. No. 3,515,919, and assigned the assignee of the present application. These correlative techniques require fewer levels than the prior art multilevel systems and have the further desirable feature that each level separately represents one ordinary binary digit. An additional feature of applicant's earlier correlative techniques is that line signal follows predetermined rules which permit error detection without the need for adding redundant digits.

Digital systems using the duobinary or orthogonal correlative techniques rarely permit doubling or quadrupling, respectively, the data rate with a minimum of equipment complexity in cost. A nonbinary correlative technique is disclosed in applicant's U.S. Pat. No. 3,601,702. This nonbinary technique is an improvement over the other prior art correlative techniques in that it readily increases the data rate to eight times, or more, that of a binary system. Thus, if a binary system could transmit data at 1200 bits per second, a duobinary system could transmit 2400 bits per second, and an orthogonal correlative system could transmit 4800 bits per second and the systems in accordance with the present invention could transmit 9600 bits per second, or more, in the same bandwidth.

The most serious and difficult problem in practical correlative systems of the type described hereinabove which have more than three levels, is the generation of a high quality signal with equal spacing between levels. This is very essential since the undesirable intersymbol interference increases rapidly with an increasing number of levels. The least number of levels in a correlative signal is three. Here the horizontal width of the open eye, of a standard eye pattern, is about 35% of the bit duration. When the number of levels is increased to 7, the horizontal width of the open eye decreases to about 12% of the bit duration. In this case, it is essential, to provide a high accuracy in level generation as well as the most efficient method of encoding.

SUMMARY OF THE INVENTION

Briefly, the invention is concerned with an apparatus or process for the efficient generation of a high-accuracy 7-level correlative signal. Most often the input signal is in serial binary form and is first changed into two parallel bit streams, each at one-half the bit rate of the binary signal, before encoding. The parallel bit streams are encoded to obtain the correlation between a present digit and the second digit back in accordance with the formula $B = C - \Delta^2 C$ MOD 4 where B is equal to the input waveform, C is the output waveform, both B anc C are in binary form, and a $\Delta^2$ indicates two units delay. The encoded binary bit streams are converted directly to a 7-level waveform without an intermediate conversion step. Further, this conversion is accomplished by digital techniques which permits better control of the spacing between levels of the multi-level signal. The multilevel waveform at the output of the digital converter has no meaning at this point and can not be interpreted in terms of the input data. This multilevel digital signal is in turn transformed by a digital-to-analog converter into a strictly band-limited multilevel correlative signal.

Figure 5:
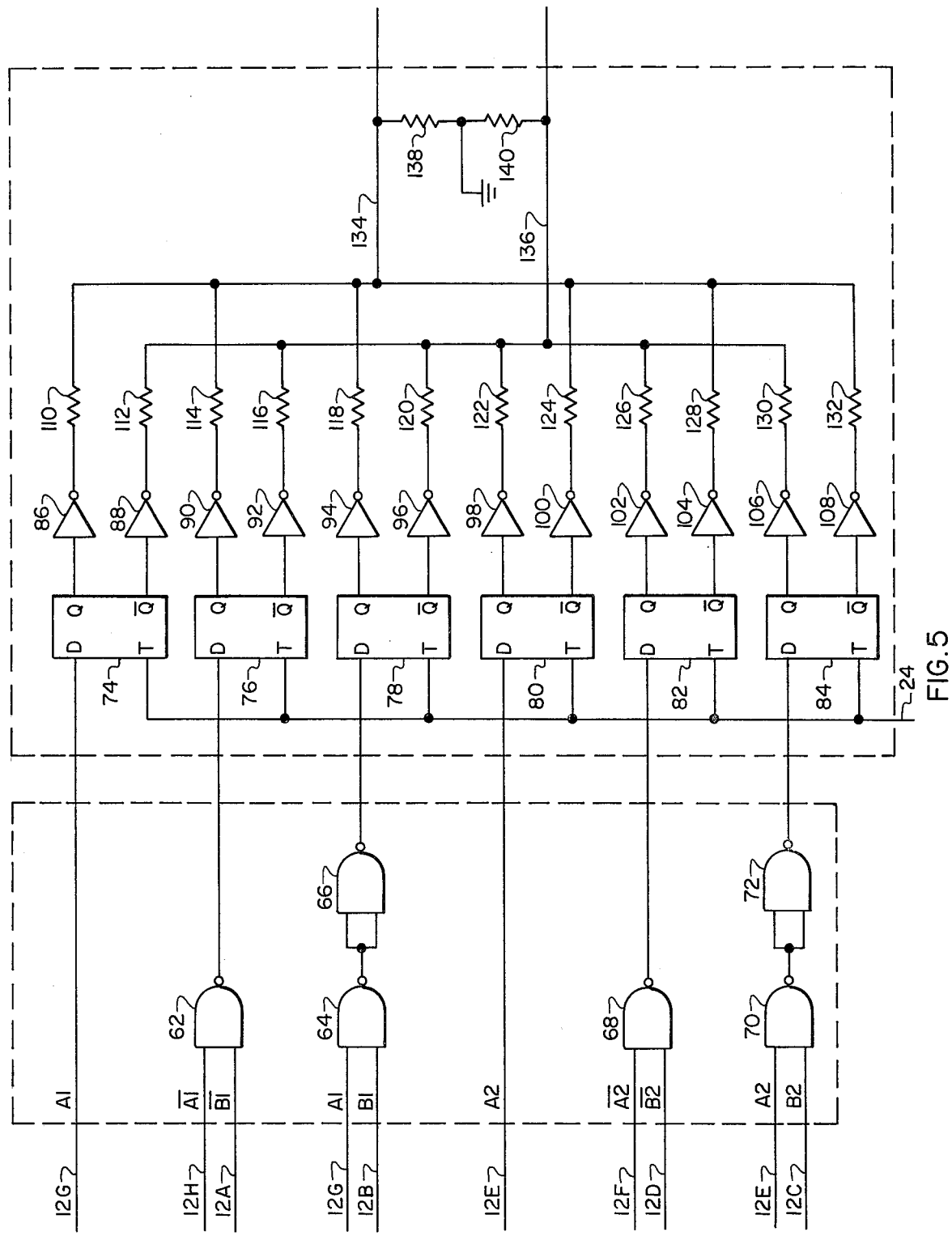
FIG. 5 is a block diagram of the preferred embodiment of the invention for use in a binary to 7-level converter.

Table I shows the binary inputs which are applied to the flip-flops of FIG. 5 and is illustrative of the summation arrangement for generating the multilevel output waveform on paths 134 and 136.

DESCRIPTION OF THE PREFERRED EMBODIMENT

Figure 1:
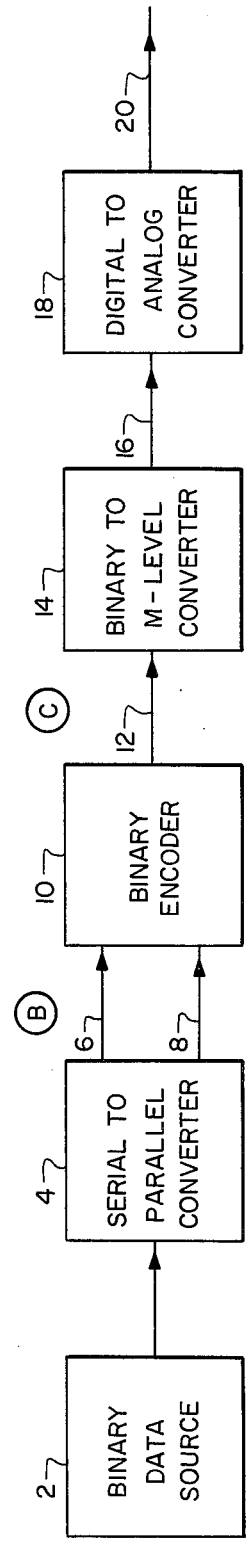
FIG. 1 is a block diagram of the preferred embodiment of the invention.

The block diagram in FIG. 1 shows the system for the generation of a 7-level signal in conjunction with a source of binary data 2. For the sake of clarity a specific system will be described which operates at a bit rate of 6.312 Mbits/sec. and in which the 7-level signal is to be generated. Serial data from the binary source 2 passes through a wellknown serial-to-parallel converter which consists essentially of two bistable multivibrators. This is, in effect, a 2-stage shift register. The two binary bit streams on paths 6 and 8 enter the binary encoder 10. The general function of encoder 10 is to take the waveform at B and produce C as follows:

$$B = C - \Delta^2 C \text{ MOD 4} \quad (1)$$

Where $\Delta^2$ indicates two units delay or 2T seconds where 1/T is the parallel speed in digits per second. In this example, the serial data input is 6.312 bits/sec., the parallel speed at B is 1/T = 3.156 bits/second. Next the encoded binary data is applied via path 12 to binary to 7-level converter 14. In the example system, the digital 7-level converter accepts the binary output from the encoder and converts it in a digital manner using logic to a digital 7-level signal. It should be noted that this 7-level signal at this stage has no meaning, i.e., it can not be interpreted in terms of the data input. Subsequently, the signal output from the converter is applied via path 16 to the digital-to-analog converter 18 which in the preferred embodiment of the invention is in the form of an analog low-pass filter $H(w)$ which converts the multilevel digital input to a strictly band-limited 7-level signal which occupies a bandwidth having a frequency which is substantially numerically equal to ¼ of the bit speed of 6.312 Mbits/sec. Therefore, the bandwidth is about 1.578 MHz. Ideally, there would be infinite loss at and beyond 1.578 MHz. In practice, the loss at 1.578 is in the order of 40 dB. It is significant that nowhere in the generation of the 7-level signal is there a 2-to-4-level conversion after encoding followed by a 4-to-7-level conversion.

Figure 2:
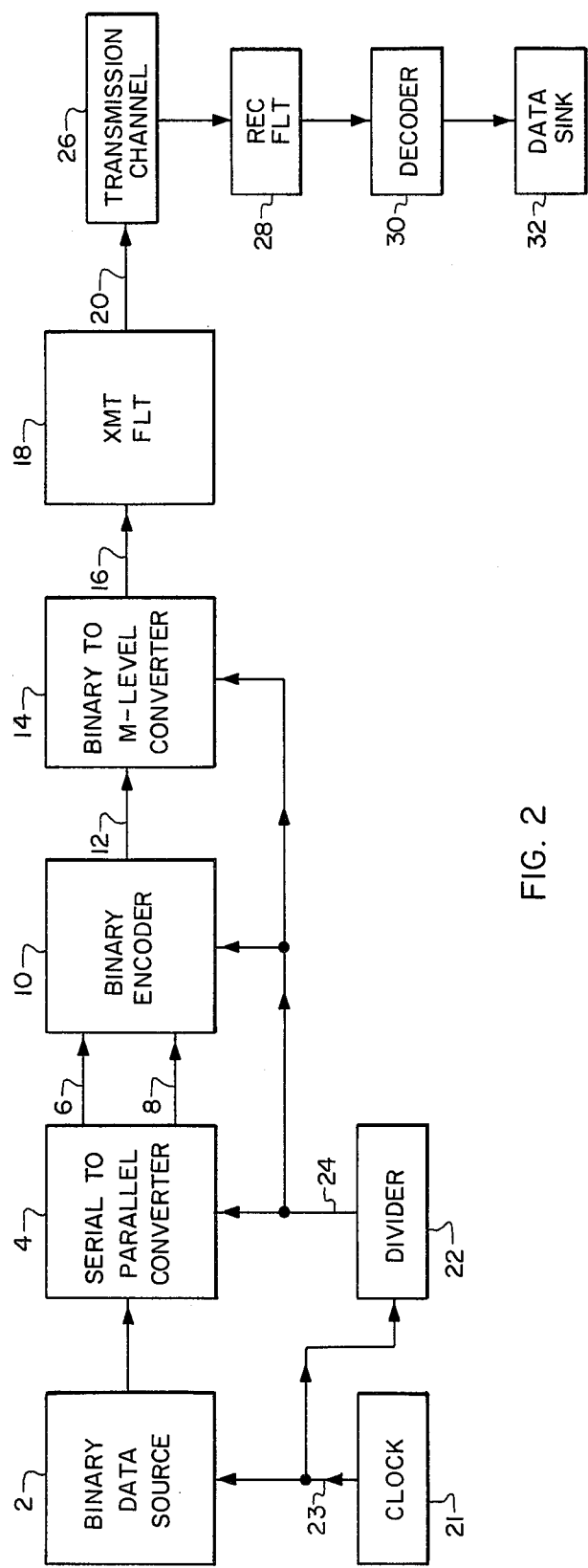
FIG. 2 is a block diagram of the preferred embodiment such as shown in FIG. 1 but includes the timing information provided by the clock and also shows the preferred embodiment used in terms of an overall system between a binary data source 2 and a data sink 32.

Referring to FIG. 2 it is to be noted that the arrangement or generating the multilevel signal in conjunction with a binary data source 2 has been modified slightly to show the clocking arrangement at the transmitting end. Further, the transmission path or channel 26 and the receiving circuitry in block form has been added. Of particular significance here is the illustration of the transmitting filter 18 and receiving filter 28. In practice, the analog low-pass filter $H(w)$ is usually split between the transmitter and receiver. It is to be noted that should the transmission channel 26 be sufficiently band-limited it is possible that the transmission channel alone would provide the necessary conversion. How the filter characteristics are split between the ends of the system depends on the particular system, the type of noise and very often practical aspects of design. Thus it should be understood that the conversion may not be complete until the signal reaches and passes through the receiving filter network at the receiver just prior to the signal being applied to decoder 30.

Figure 3:
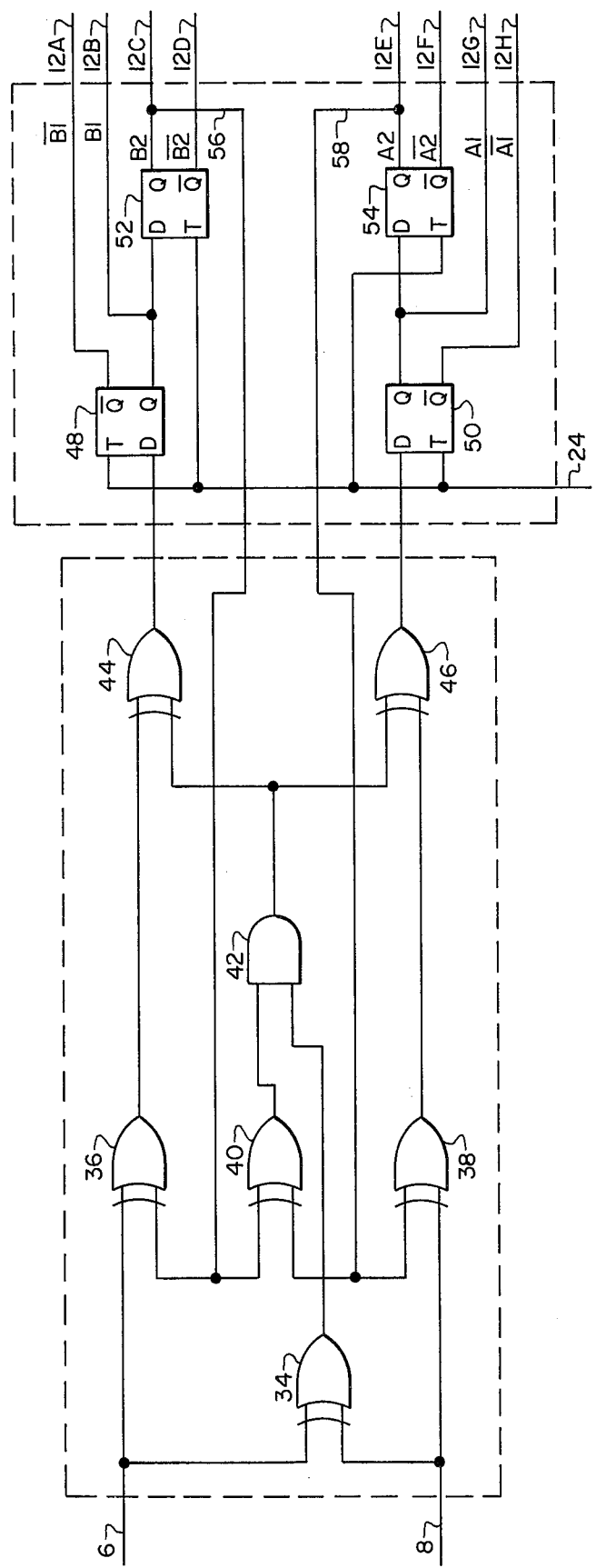
FIG. 3 is a block diagram of the preferred embodiment of the binary encoder 10 used in a 7-level encoder.

Referring now to FIG. 3, it is noted that a preferred embodiment of encoder 10 is illustrated. This encoder consists of 6 Exclusive OR (EX-OR) gates 34, 36, 38, 40, 44 and 46. The single AND-gate shown at 42 may be made up from 2 NAND-gates coupled so as to provide the AND-gate function. In addition, there are four D-type (delay type) flip-flops 48, 50, 52 and 54. Timing for this example is at the rate of 3.156 bits/sec. and is applied via path 24 to the T inputs of the flip-flops. In comparison with the AND-OR logic used in the prior art, it is to be noted that the logic used in the preferred embodiments of the instant invention are less complex and use fewer components.

The encoder accepts binary signal on two parallel inputs 6 and 8 such as is shown in FIG. 3. Note that the parallel input signals on paths 6 and 8 are derived from the binary input signal D which is at twice the rate of the input signals to encoder 10. The function of the encoder is as was described hereinabove and results in waveforms A1, $\overline{A1}$, A2, $\overline{A2}$, B1, $\overline{B1}$, B2 and $\overline{B2}$ as illustrated. Note that each output signal is binary in character on paths 12A through 12H. These are then applied to the converter 14.

Figure 6:
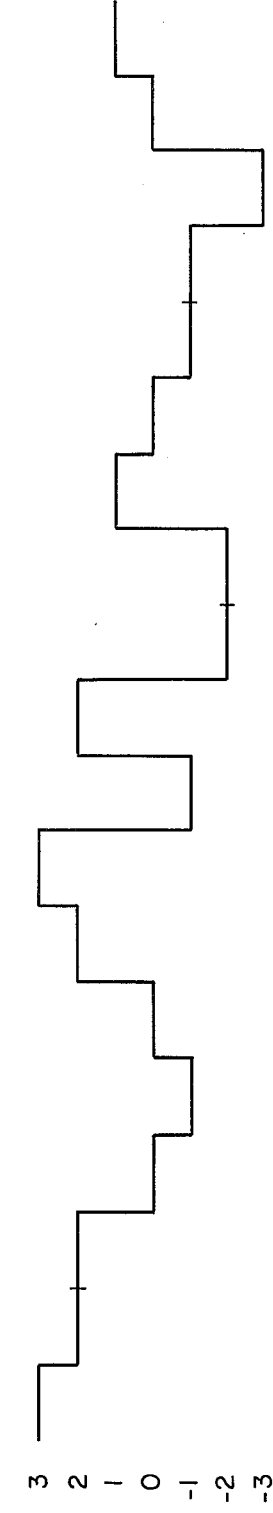
FIG. 6 is a waveform diagram illustrating the output waveform of the binary to 7-level converter for the waveform input shown in FIG. 4.
Figure 4:
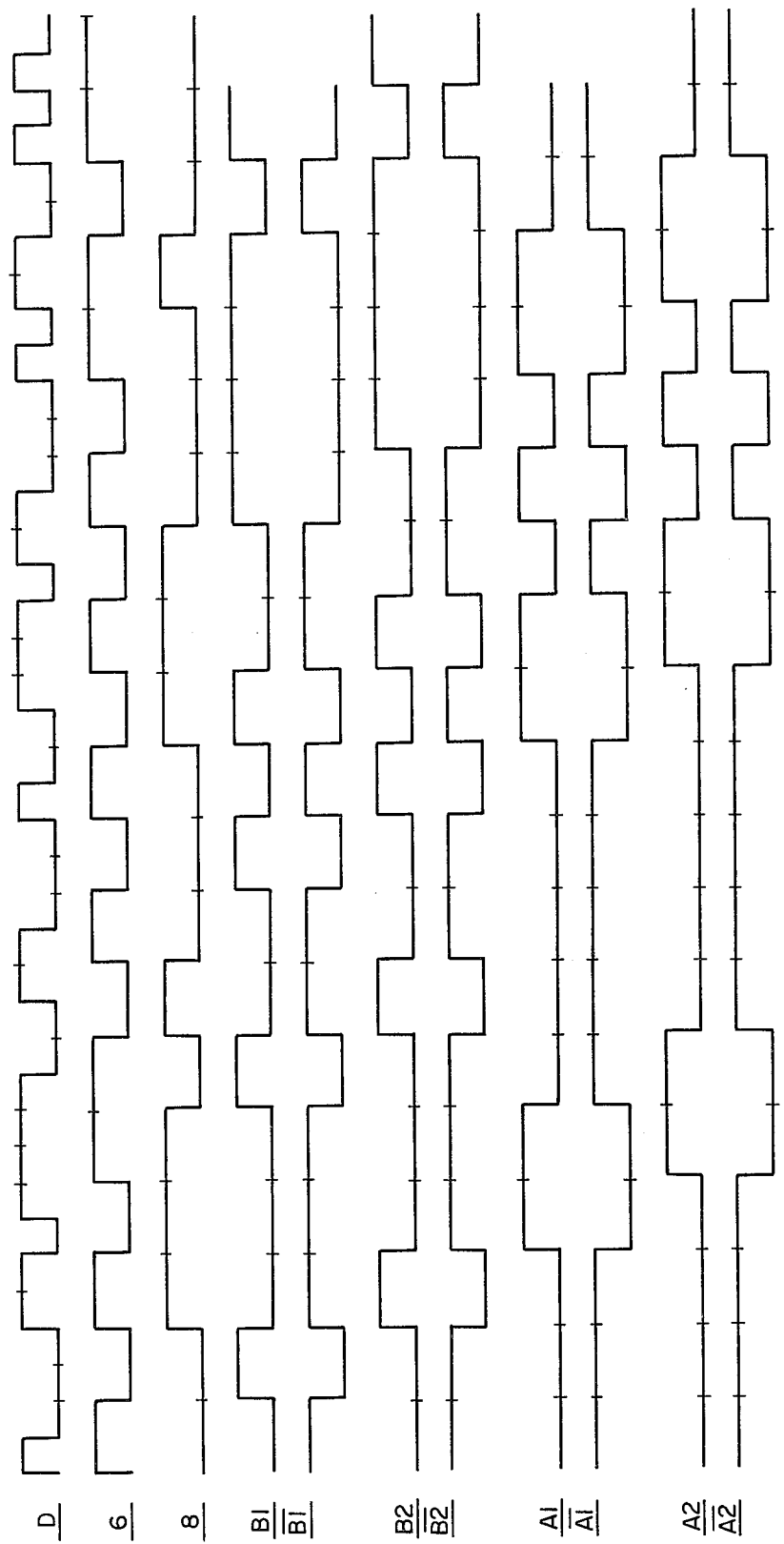
FIG. 4 is a waveform diagram which shows the original binary signal input D and some of the waveforms which occur within the binary encoder of FIG. 3.

A preferred embodiment of the binary to 7-level converter, for the example case, is illustrated in FIG. 5. Here a direct conversion from 2-to-7-levels is accomplished using standard logic gates, flip-flops and the summing arrangement. NAND logic is shown but it is apparent that gates 64 and 66, and also 70 and 72 could be replaced by standard AND-gates. In that case one would only have two NAND-gates and two AND-gates in addition to 6 D-type flip-flops, 12 inverters, 12 bridging resistors, and 2 summing resistors 138 and 140. The flip-flop outputs for each time slot are shown in Table I. The 7-level waveform resulting from the conversion process is illustrated in FIG. 6. The digital conversion from binary 2-level inputs to 7-level is of extreme significance. Digital conversion to 7-level assures precision and accuracy that can not be achieved by analog means or going from 2-to-4, followed by conversion from 4-to-7-levels using just an analog filter. It must, however, be emphasized that the 7-level digital output in FIG. 5 is not modified duobinary and can not be interpreted at this stage in terms of the input bit stream. It is just an intermediate step, the purpose of which is to simplify conversion by going directly from 2-to-7-levels and to provide a very high degree of accuracy in generating the 7-levels digitally. Here the spacing between levels is equal with a fairly high degree of precision. The binary variables A1, B1, etc. are taken from the encoder of FIG. 3 and the binary logic functions in FIG. 5 are as follows:

$$X1 = A1 + B1$$
$$X2 = A1$$
$$X3 = A1\,\overline{B1}$$
$$X4 = \overline{A2 + B2} \text{ or}$$
$$\overline{X4} = A2 + B2$$
$$X5 = \overline{A2} \text{ or}$$
$$\overline{X5} = A2$$
$$X6 = \overline{A2}\,\overline{B2} \text{ or}$$
$$\overline{X6} = A2\,\overline{B2}$$

These binary functions are converted using 6 D-flip-flops and 12 identical resistors to obtain a 7-level balanced signal ready to enter low-pass filter H(w). Reverting back to FIG. 1 the output of converter 14 is applied via path 16 to analog converter 18. In the preferred embodiment of the invention this is a low-pass filter which cut-offs at a frequency substantially equal to ¼ the bit rate of the original binary data and is or maybe split between the transmitter receiver. For example, if the noise is white gaussian noise, optimum conditions are achieved by equal splitting. That is the transmitting and receiving filters are identical and each is $[H(w)]^{\frac{1}{2}}$ so that both are $H(w)$. The optimum characteristics for this filter is in a 100% duty cycle 7-level signal as in FIG. 5 are specified as follows:

Analog Low-Pass Conversion Filter (H(w))

$$w = 2\pi f$$

$f$ = frequency in MHz
$$H(f) = (\pi f T) \cot (\pi f T)$$
$$H(0) = 1$$
for $0 \leq f \leq 1/2T$
and zero elsewhere
where $2/T$ = input serial bit speed in bits/sec.

EXAMPLE $2/T$ = 6.312 Mbits/sec. then
$$H(f) = (\pi f/3.156) \cot (\pi f/3.156)$$

$$0 \leq f \leq 1.578 \text{ MHz}$$

and zero elsewhere and $f$ expressed in MHz In practice loss beyond 1.578 MHz is more than 40 dB and differential delay up to 12 dB point 25 nseconds.

While the invention has been particularly shown and described with reference to a preferred embodiment thereof, it will be understood by those skilled in the art that changes in form and detail may be made therein without departing from the spirit and scope of the invention.

What is claimed is:

1. Apparatus for generating a 7-level correlative signal from a serial binary input signal comprising:
    means for changing said serial binary signal into two parallel binary bit streams, each at one-half the bit rate of the serial binary signal;
    means for encoding the two parallel binary bit streams to obtain correlation between a present digit and the second digit back from said present digit;
    means for digitally converting the encoded signal into a 7-level digital signal; and
    means for transforming said 7-level digital signal into a band-limited correlative 7-level analog signal related on a one-to-one basis to the binary input signal.

2. Apparatus in accordance with claim 1 wherein said means for encoding further comprises:
    timing means;
    gating means having a plurality of inputs connected to respective output of said changing means and providing a plurality of outputs;
    delay means having a plurality of inputs connected to the outputs of said gating means, having an input connected to said timing means, and providing a plurality of outputs having a delay of one time interval of the parallel bit streams and an equal number of outputs each having delays equal to two time intervals; and
    feedback means feeding back to said gating means selected outputs from said delay means.

3. Apparatus in accordance with claim 2 wherein said means for digitally converting further comprises;
    a second gating means having a like plurality of inputs connected to respective outputs of said encoding means, and having a plurality of outputs; and
    summing means having inputs for connection to the outputs of said second gating means, and an input connected to said timing means, said summing means providing a 7-level output signal.

4. Apparatus in accordance with claim 3 wherein said transforming means further comprises:
    a low-pass filter H(w) having an effective cutoff frequency which is substantially equal to ¼ the bit rate of the original serial binary input signal.

5. A method of generating a 7-level correlative signal from a serial binary signal consisting of the steps of:
    changing the serial binary signal into a pair of parallel bit streams each at one-half the rate of the serial binary signal;
    encoding the parallel bit streams to obtain encoded binary bit streams in accordance with the relation $$B = C - \Delta^2 C \text{ MOD } 4$$

where B is the input waveform, C is the output waveform and $\Delta^2$ indicates two intervals of delay or 2T seconds where 1/T is the one-half rate bit speed;

converting the encoded signals into a 7-level digital signal; and transforming the 7-level signal into a band-limited correlative 7-level coded signal which is related on a one-to-one basis with the binary input signal.

6. Apparatus for generating a 7-level correlative signal from a serial binary input signal comprising:

means for changing said serial binary input signal into two parallel binary bit streams, each at one-half the bit rate of the serial binary signal;

means for encoding the two parallel binary bit streams to obtain binary outputs in accordance with the relation $$B = C - \Delta^2 C \text{ MOD } 4$$

where B is the input waveform, C is the output waveform and $\Delta^2$ indicates two intervals of delay or 2T seconds where 1/T is the one-half rate bit speed;

means for digitally converting the encoded signal into a 7-level digital signal; and means for transforming said 7-level digital signal into a band-limited correlative 7-level analog signal related on a one-to-one basis to the binary input signal.

7. Apparatus in accordance with claim 6 wherein said means for encoding further comprises:

timing means;

gating means having first and second inputs connected to receive the two parallel binary outputs from said changing means, and providing gated signals on first and second outputs;

delay means having first and second inputs connected to the respective outputs of said encoding means, having an input connected to said timing means, having four binary outputs with one interval of delay and four outputs having two intervals of delay; and means for feeding back to said gating means selected two unit delayed binary signals.

8. Apparatus in accordance with claim 7 wherein said means for digitally converting further comprises:

a second gating means having inputs connected to the 8 outputs from said encoding means, said gating means providing binary output signals; and summing means having 6 inputs connected to receive the gated output signals from the second gating means, having an input connected to said timing means, said summing means providing a 7-level output signal.

9. Apparatus in accordance with claim 8 wherein said transforming means further comprises:

a low-pass filter H($w$) having an effective cut-off frequency which is substantially equal to ¼ the bit rate of the original serial binary input signal.

10. Apparatus in accordance with claim 9 wherein said summing means further comprises:

six D-type flip-flops each having its D input connected to one output of said second gating means, having the T input connected to said timing means and providing Q and $\overline{Q}$ at the output of each flip-flop;

twelve inverters one for each flip-flop output, each having its output connected to an associated flip-flop output, and each having an output;

twelve equal valued resistors each having one end connectd to the output of one inverter, the other ends of the first three resistors associated with Q outputs of the first three flip-flops are connected together and these are connected together with the other end of the resistors associated with the $\overline{Q}$ outputs of the second three flip-flops, and this junction is one path; and, similarly the next three resistors have the one end connected to the outputs of the three inverters associated with the $\overline{Q}$ output of the first three flip-flops, the final three resistors have the one end connected to the outputs of the three inverters associated with the Q outputs of the last three flip-flops and the other ends of the second six resistors are joined together and this junction from the beginning of a second path; and a pair of equal valued resistors, the first resistor having one end connected to the first path, the second resistor having one end connected to the second path and the other ends of the two resistors connected together and connected to a common ground point.

* * * * *